United States Patent
Woods (10) Patent No.: US 11,619,856 B1
(45) Date of Patent: Apr. 4, 2023

(54) SUPPRESSING LEAKAGE CURRENTS IN PERIODIC TRAVELLING WAVE ELECTRODE STRUCTURES

(71) Applicant: Ciena Corporation, Hanover, MD (US)

(72) Inventor: Ian Nicholas Woods, Nepean (CA)

(73) Assignee: Ciena Corporation, Hanover, MD (US)

( * ) Notice: Subject to any disclaimer, the term of this patent is extended or adjusted under 35 U.S.C. 154(b) by 40 days.

(21) Appl. No.: 17/498,218

(22) Filed: Oct. 11, 2021

(51) Int. Cl.
*G02F 1/225* (2006.01)
*G02F 1/21* (2006.01)

(52) U.S. Cl.
CPC ............ *G02F 1/2257* (2013.01); *G02F 1/212* (2021.01); *G02F 2202/102* (2013.01); *G02F 2202/108* (2013.01)

(58) Field of Classification Search
CPC .. G02F 1/2257; G02F 1/212; G02F 2202/102; G02F 2202/108; G02F 1/011; G02F 1/025; G02F 1/0344; G02F 1/035; G02F 1/0356; G02F 1/225; G02F 1/2255; G02F 2201/127
See application file for complete search history.

(56) References Cited

U.S. PATENT DOCUMENTS

| | | | |
|---|---|---|---|
| 8,384,980 B2 * | 2/2013 | Fukuda | G02F 1/025 359/248 |
| 9,182,546 B2 | 11/2015 | Prosyk et al. | |
| 9,625,648 B2 | 4/2017 | Prosyk et al. | |
| 10,191,350 B2 * | 1/2019 | Yu | G02F 1/2257 |
| 11,520,175 B2 * | 12/2022 | Lebby | G02F 1/065 |

OTHER PUBLICATIONS

D. V. Donetsky, et al., "Optimization of p-doping profile of 1.3-?m InGaAsP/InP MQW lasers for high-temperature operation," in Conference on Lasers and Electro-Optics May 3-8, 1998, Optical Society of America, paper CWN2.
Y. Ogiso et al., "80-GHz Bandwidth and 1.5-V Vp InP-Based IQ Modulator," in Journal of Lightwave Technology, vol. 38, No. 2, pp. 249-255, Jan. 15, 2020, doi: 10.1109/JLT.2019.2924671.

\* cited by examiner

*Primary Examiner* — John Bedtelyon
(74) *Attorney, Agent, or Firm* — Young Basile Hanlon & MacFarlane, P.C.

(57) ABSTRACT

A device includes two or more waveguide portions that are adjacent to each other, and each of the two or more waveguide portions includes a first n-doped semiconductor structure and a p-doped semiconductor structure in contact with the first n-doped semiconductor structure at a bottom surface and two lateral walls on opposite ends of the first n-doped semiconductor structure. The device includes an undoped semiconductor structure in contact with each of the p-doped semiconductor structures and free of contact with each of the first n-doped semiconductor structures, and the undoped semiconductor structure includes an optical waveguide core embedded within the undoped semiconductor structure. The device includes a second n-doped semiconductor structure in contact with the undoped semiconductor structure and free of contact with each of the first n-doped semiconductor structures and the p-doped semiconductor structures.

13 Claims, 8 Drawing Sheets

SUPPRESSING LEAKAGE CURRENTS IN PERIODIC TRAVELLING WAVE ELECTRODE STRUCTURES

TECHNICAL FIELD

This disclosure relates to a configuration of a periodic traveling wave electrode structure (e.g., a structure having an n-p-i-n configuration).

BACKGROUND

When using Indium Phosphide and/or Indium Gallium Arsenide, traveling wave electrode structures are effective for modulating an index of refraction that produces a phase modulation in guided optical waves. There is a strong motivation to develop photonic integrated circuit transmitter devices, or modulators, capable of electro-optic conversion bandwidths of 100 GHz to achieve symbol switching rates of up to 200 GBaud/s. One configuration for a modulator includes periodic traveling wave electrode structures. Each period of the traveling wave electrode structure extends from a point of one waveguide portion to symmetrical portion of another waveguide portion, and each waveguide portion includes a structure of a n-p-i-n stack of semiconductor structures (e.g., Indium Phosphide) with the doped semiconductor structures separated by an insulator (i.e., an undoped or intrinsic semiconductor structure). However, this structure can suffer from undesirable current flow (also called leakage) between the bottom n-doped semiconductor structure, the insulator (i.e., the undoped semiconductor structures between the doped portions), and the top n-doped semiconductor structure.

SUMMARY

Techniques described herein enable a traveling wave electrode and optical waveguide structure having the desirable bandwidth of 100 GHz that mitigates or prevents leakages in a semiconductor stack (e.g., an n-p-i-n stack) along vertical and horizontal (i.e., longitudinal) pathways between the top n-doped semiconductor structure, the undoped semiconductor structures at the lateral walls of the top n-doped semiconductor structure, and the bottom n-doped semiconductor structure. Also described are methods of making the waveguide portions (i.e., the n-p-i-n stacks), whether the waveguide portions are small or large, so that when in use, modulators do not suffer from the leakages between the semiconductor structures.

In one aspect, in general, a device includes two or more waveguide portions that are adjacent to each other. Each of the two or more waveguide portions include a first n-doped semiconductor structure and a p-doped semiconductor structure in contact with the first n-doped semiconductor structure at a bottom wall and two lateral walls on opposite ends of the first n-doped semiconductor structure. The device further includes an undoped semiconductor structure in contact with each of the p-doped semiconductor structures and free of contact with each of the first n-doped semiconductor structures. The undoped semiconductor structure includes an optical waveguide core embedded within the undoped semiconductor structure. The device further includes a second n-doped semiconductor structure in contact with the undoped semiconductor structure and free of contact with each of the first n-doped semiconductor structures and the p-doped semiconductor structures.

In another aspect, in general, a method includes forming a waveguide that has a stack including a sequence of a first n-doped semiconductor structure, a p-doped semiconductor structure, an undoped semiconductor structure including an optical waveguide core embedded within the undoped semiconductor structure, and a second n-doped semiconductor structure. The method includes removing one or more portions of the stack that includes the first n-doped semiconductor structure and the p-doped semiconductor structure to form one or more waveguide portions that have a sequence of the first n-doped semiconductor structure and the p-doped semiconductor structure that is positioned on the undoped semiconductor structure. The method includes extending the p-doped semiconductor structure to contact opposing lateral walls of the first n-doped semiconductor structure and to contact a top surface of the undoped semiconductor structure where the one or more portions of the stack were removed.

In another aspect, in general, a modulator includes one or more traveling wave electrodes, and the one or more periods extend from a portion of a waveguide portion to a symmetrical portion of another waveguide portion. Each of the waveguide portions are positioned adjacent to each other. Each of the waveguide portions include a first n-doped semiconductor structure and a p-doped semiconductor structure in contact with the first n-doped semiconductor structure at a bottom surface and two opposing lateral walls of the first n-doped semiconductor structure. The traveling wave electrode includes an undoped semiconductor structure in contact with each of the p-doped semiconductor structures and free of contact with each of the first n-doped semiconductor structures, and the undoped semiconductor structure includes an optical waveguide core embedded within the undoped semiconductor structure. The traveling wave electrode includes a second n-doped semiconductor structure in contact with the undoped semiconductor structure and free of contact with each of the first n-doped semiconductor structures and the p-doped semiconductor structures.

Aspects can include one or more of the following features.

The optical waveguide core may extend parallel relative to a propagation axis, and the two lateral walls of the first n-doped semiconductor structure may extend generally perpendicular relative to the propagation axis. The two or more waveguide portions may be separated at an opposing wall of the two lateral walls of the p-doped semiconductor structures by the undoped semiconductor structure so that under a DC bias current flow is mitigated or prevented between the first and second n-doped semiconductor structures through the undoped semiconductor structure. The undoped semiconductor structure may extend from an upper edge of each of the two lateral walls of the p-doped semiconductor structure of the two or more waveguide portions to second n-doped semiconductor structure. Each of the two lateral walls of the p-doped semiconductor structure may extend from a bottom edge to a top edge of the first n-doped semiconductor structure so that leakage of current is prevented or mitigated from the first n-doped semiconductor structure to an outer surface of the two lateral walls of the p-doped semiconductor structure. The first and/or second n-doped semiconductor structure, p-doped semiconductor structure, or any combination thereof may comprise Indium Phosphide or semiconductor materials of a similar lattice constant to Indium Phosphide. The undoped semiconductor structure may comprise Indium Phosphide or semiconductor materials of a similar lattice constant to Indium Phosphide. The optical waveguide core may include a multi-quantum well comprised of semiconductor materials with a lower band-gap energy than Indium Phosphide. The device may prevent or mitigate leakage from the first n-doped semiconductor structure to an outer surface of the two lateral walls of the p-doped semiconductor structure. The device is configured to be integrated with a Mach-Zehnder modulator. The device may be integrated with a transverse ridge waveguide.

The method may further include forming two or more waveguide portions that have the sequence of the n-doped semiconductor structure and the p-doped semiconductor structure that is disposed on the undoped semiconductor structure. The method may further include removing a portion of the p-doped semiconductor structure between the two or more waveguide portions so that each of the two or more waveguide portions comprise the first n-doped semiconductor structure in contact with the p-doped semiconductor structure on a bottom wall and the opposing lateral walls first n-doped semiconductor structure. The method may further include extending the undoped semiconductor structure to replace the portion of p-doped semiconductor that was removed so that the undoped semiconductor structure contacts opposing lateral walls of the p-doped semiconductor structure.

Each of the two or more waveguide portions may be separated by the undoped semiconductor structure and/or p-doped semiconductor structure having a distance of about 35 microns to about 400 microns or a distance of about 5 microns to about 35 microns, depending on whether an undoped semiconductor structure separates the waveguide portions.

Aspects can have one or more of the following advantages.

By having a p-cage structure around the top n-doped semiconductor structure, leakages between the undoped semiconductor structures and the bottom n-doped semiconductor structure are mitigated or prevented. In some examples, the p-cage completely separates the top n-doped semiconductor structure and the undoped semiconductor structure so that top n-doped semiconductor structure is covered on two lateral walls and bottom wall and no leakage between structures occurs. In some examples, the p-cage covers the bottom wall and a portion of two of the opposing lateral walls of the top n-doped semiconductor structure so that leakages to the undoped semiconductor structures that is positioned horizontally are mitigated. In other examples, the p-cages may form the insulator between the n-p-i-n stack, and the traveling wave electrode retains the advantageous bandwidth of 100 GHz.

Another advantage is that the p-cage of the n-p-i-n stack uses p-doped semiconductor structures that block current above the optical waveguide core, which allows the p-doped semiconductors to be conveniently removed and replaced with undoped semiconductor structures in the electrically passive parts of the traveling wave electrode structure. This reduces the optical loss at the top n-doped semiconductor structure of at each n-p-i-n stack compared to using configurations other than n-p-i-n stacks, for example, n-i-p and n-i-p-n stacks.

One advantage of the methods described herein is that simple techniques may be used to form the p-cage from existing structures. For example, by growing the n-p-i-n structure and etching the gaps between the n-p-i-n structures and growing either p-doped cages and/or undoped semiconductor structures, the traveling wave electrode structures can be modulated to fit the needs of the desired period size. A period extends from one portion a waveguide portion to a symmetrical portion of an adjacent waveguide portion, and each waveguide portion is integrated as an n-p-i-n stack. In each waveguide, the top n-doped semiconductor structure is separated from an adjacent top n-doped semiconductor structure by at least the p-doped semiconductor material. In some examples, where the gaps between electrical contact sections of adjacent periods are small, p-doped semiconductor structures may only form separation between the top n-doped semiconductor structures. In other examples where the gaps between electrical contact sections of adjacent periods are larger, the p-doped semiconductors may be first etched into cages and undoped semiconductor structures may be grown between the p-cages. In either case, the p-doped semiconductor structure may be formed around the top n-doped semiconductor structure with relative ease and with high modulation.

Other features and advantages will become apparent from the following description, and from the figures and claims.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The periodic traveling wave electrode structures described herein can be used in a Mach-Zehnder modulator (MZM) to control radio frequency (RF) waves that are used to modulate co-propagating optical waves. For example, an MZM can be used to modulate a provided optical carrier wave with data to provide a modulated data signal in an optical communication system. An MZM uses a Mach-Zehnder interferometer (MZI) to modulate the amplitude of an optical wave that is split at an input over two optical waveguide arms and combined, with different respective phase shifts (e.g., a differential phase shifts), at an output. The combined optical waves constructively or destructively interfere, depending on the relative phase shift, to provide an amplitude modulated optical wave. Some MZMs are travelling-wave MZMs (TW-MZMs), which apply phase shifts over the arms using an electrical wave that propagates over an electrical wave transmission line comprising electrodes that are integrated into the MZM structure. As referred to herein, such a traveling wave electrode structure includes a series of waveguide portions arranged as periods in a periodic structure.

Each period includes a portion that extends from a point of the waveguide portion to a symmetrical portion of an adjacent waveguide portion, and each period is integrated into a periodic structure that provides both an electrical waveguide pair for the RF wave (e.g., from a coupled electrical transmission line) and an optical waveguide pair for the co-propagating optical wave. The pairs of waveguides can form the arms of the MZM (e.g., with each optical waveguide configured as a transverse ridge waveguide). As the RF wave propagates to the pair of waveguide portions the voltage associated with this RF wave generates an electric field in each waveguide portion, which modifies the index of refraction and modulates the phase of the optical wave propagating along the optical waveguide pair. If the velocities of the optical and RF waves are matched, the phase change induced by the RF wave on the optical wave can accumulate sufficiently to achieve both phase and amplitude modulation.

Figure 1:
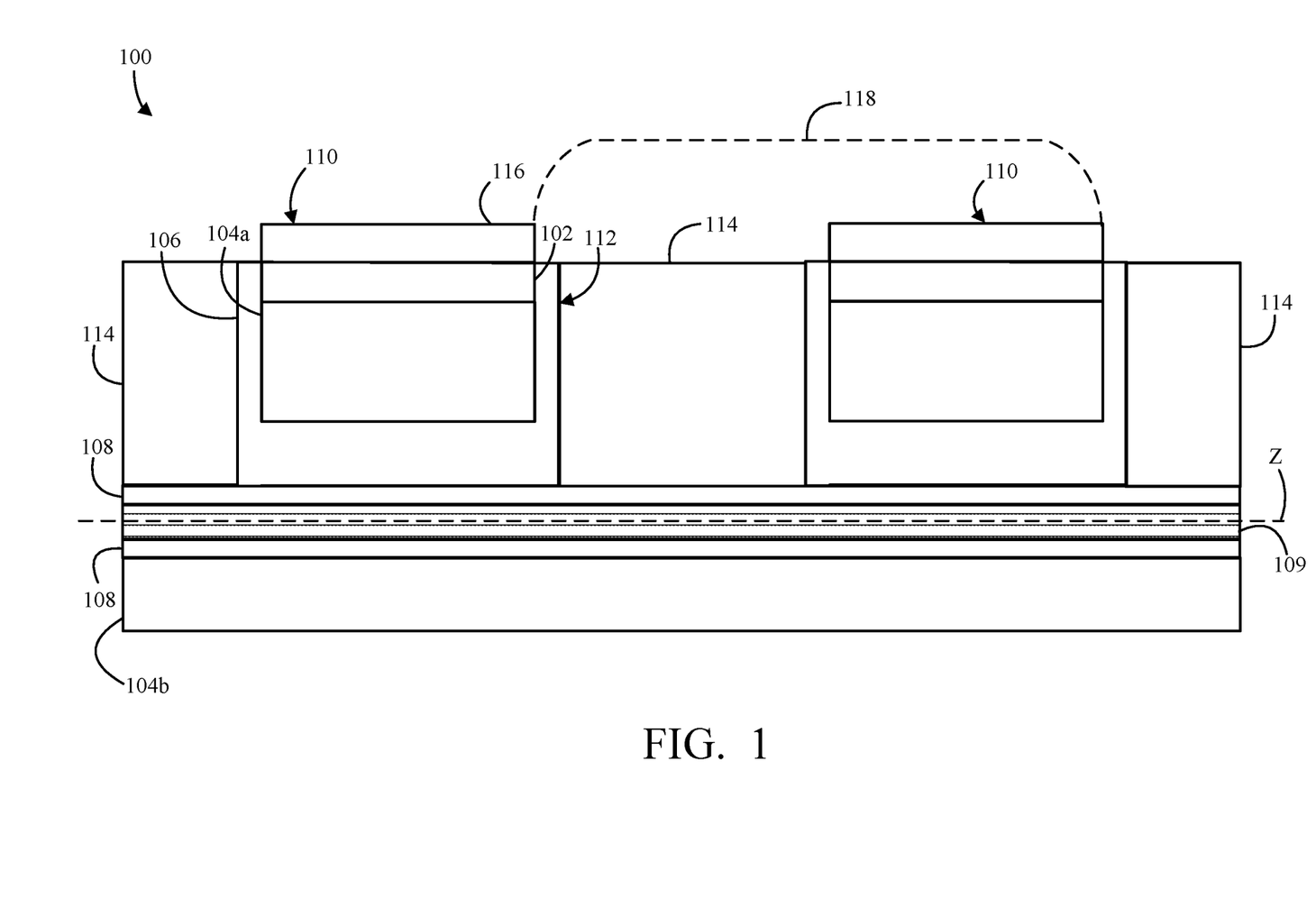
FIG. 1 is a side view of a traveling wave electrode.
Figure 2A:
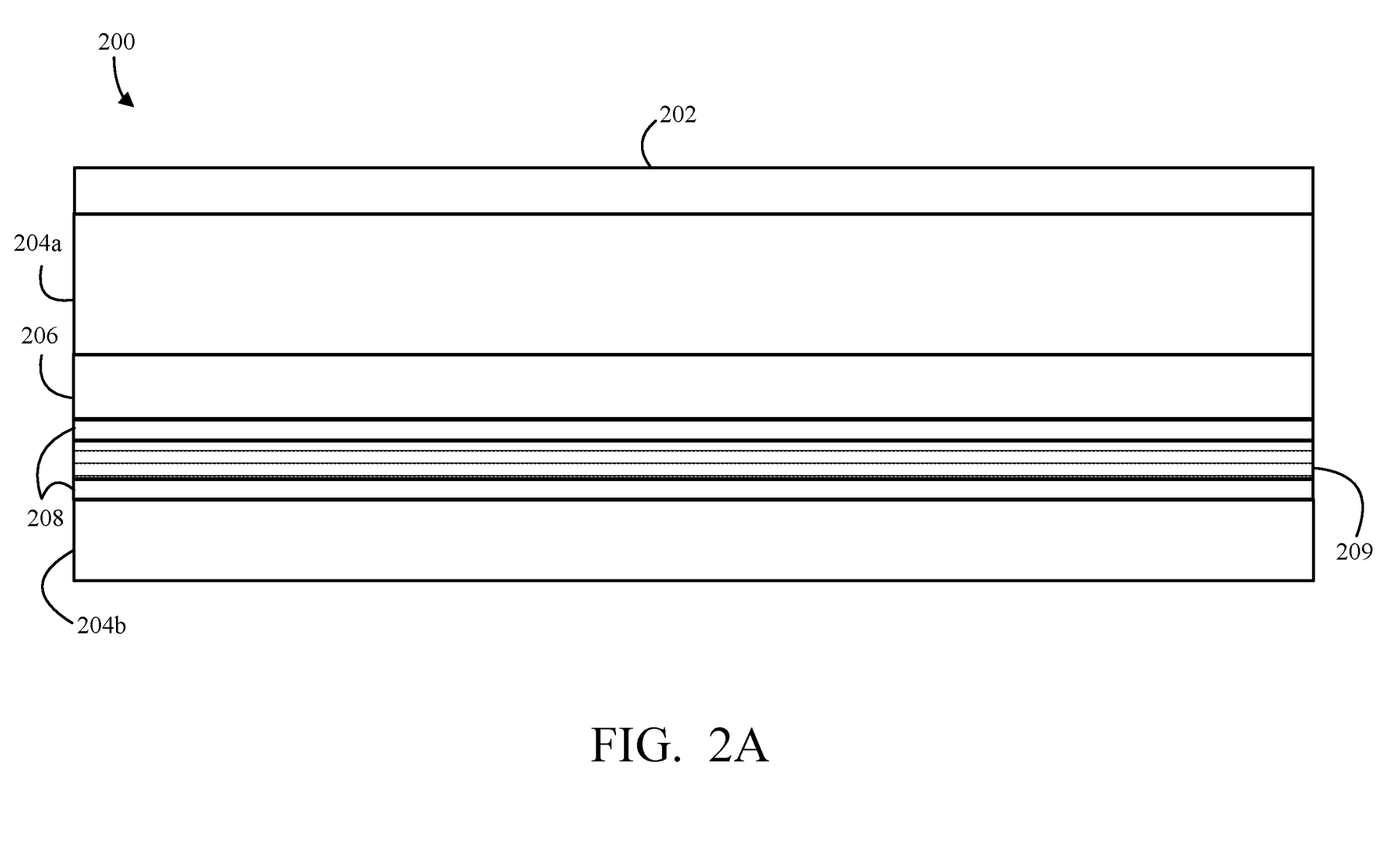
FIG. 2A is a side view of a traveling wave electrode.
Figure 2B:
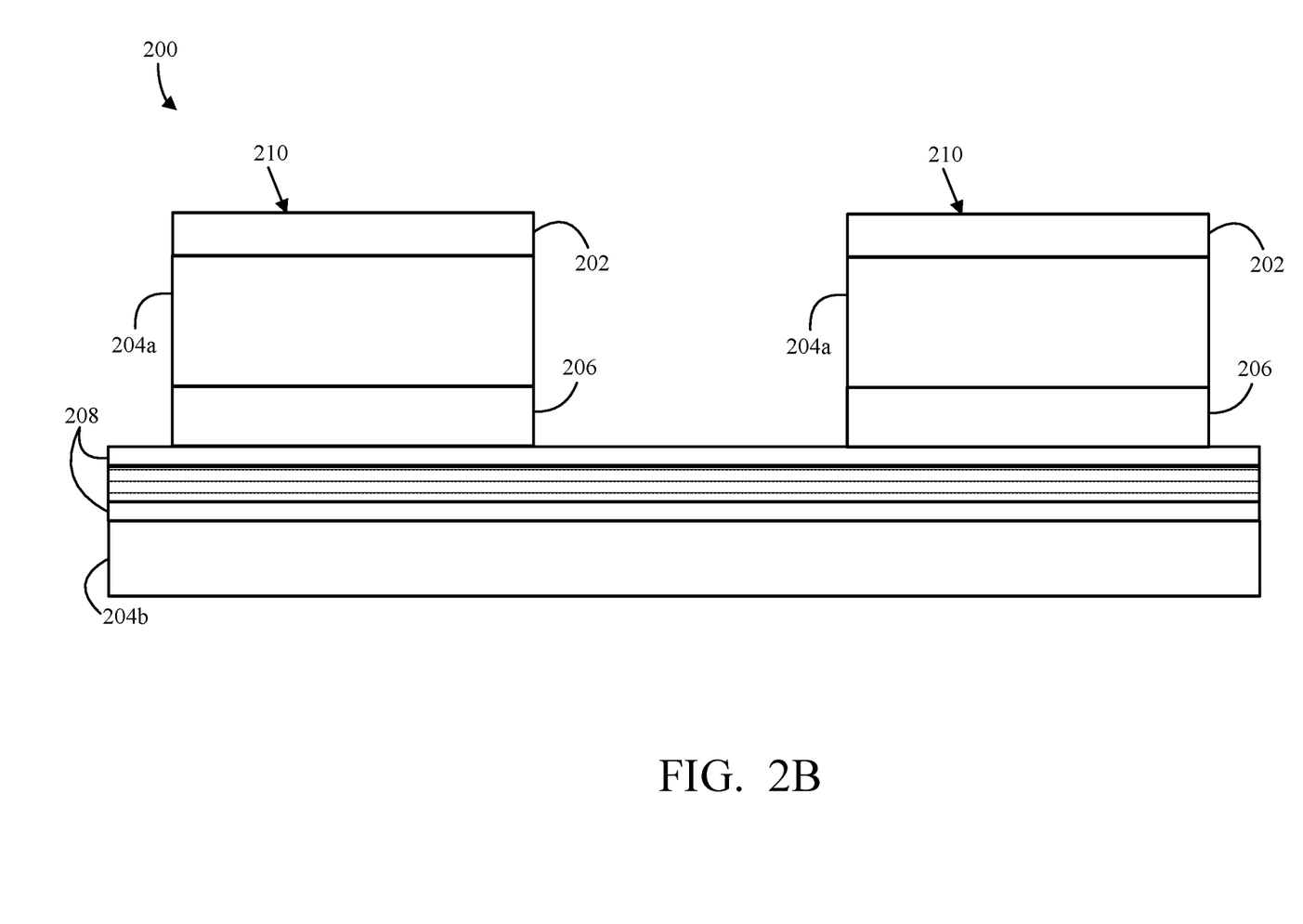
FIG. 2B is a side view of the traveling wave electrode of FIG. 2A with a portion of the first n-doped and p-doped semiconductor structures removed.
Figure 2C:
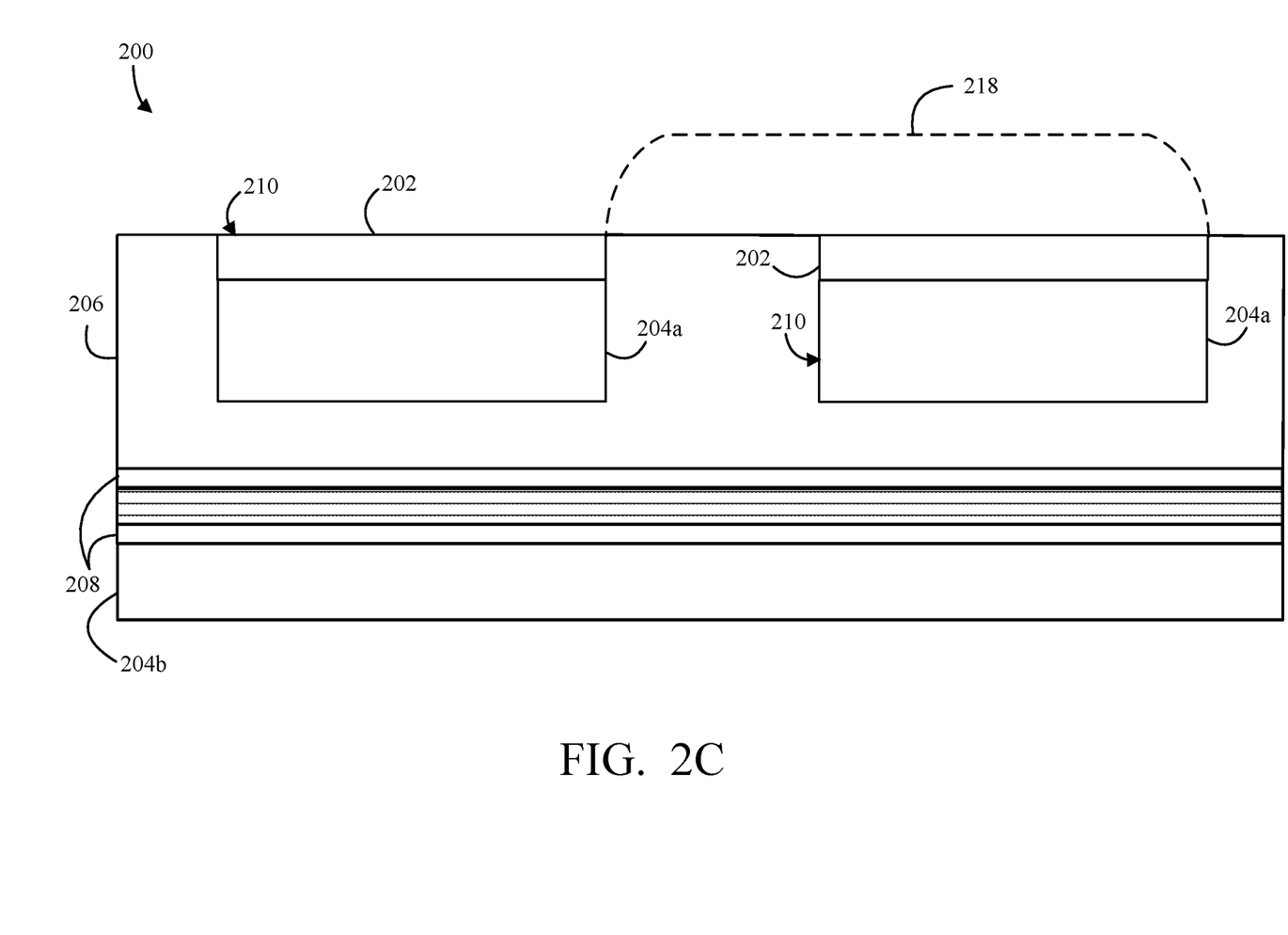
FIG. 2C is a side view of the traveling wave electrode of FIG. 2B that is filled in with the p-doped semiconductor structure.
Figure 2D:
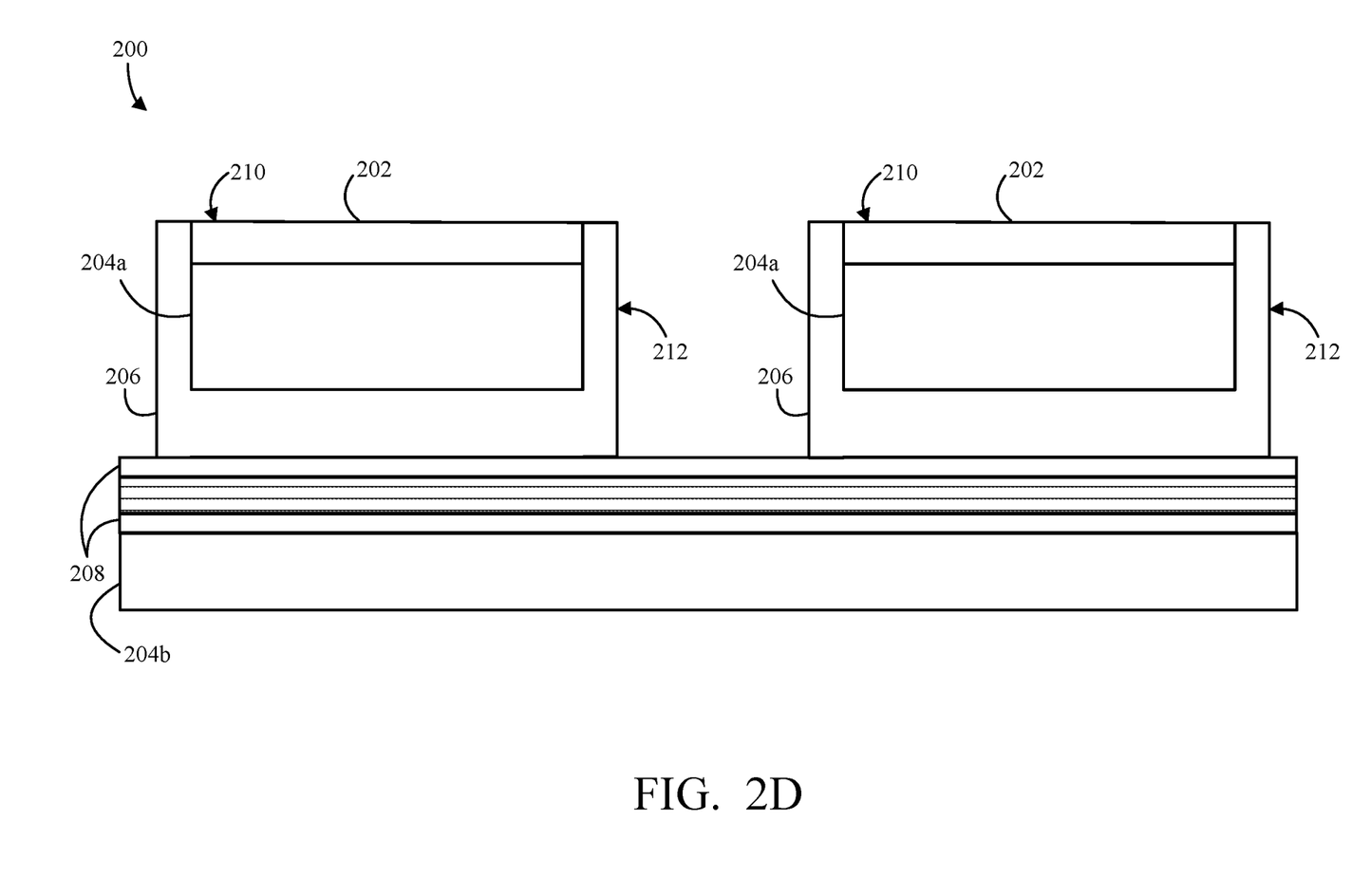
FIG. 2D is a side view of the traveling wave electrode of FIG. 2C with a portion p-doped semiconductor structure removed.
Figure 2E:
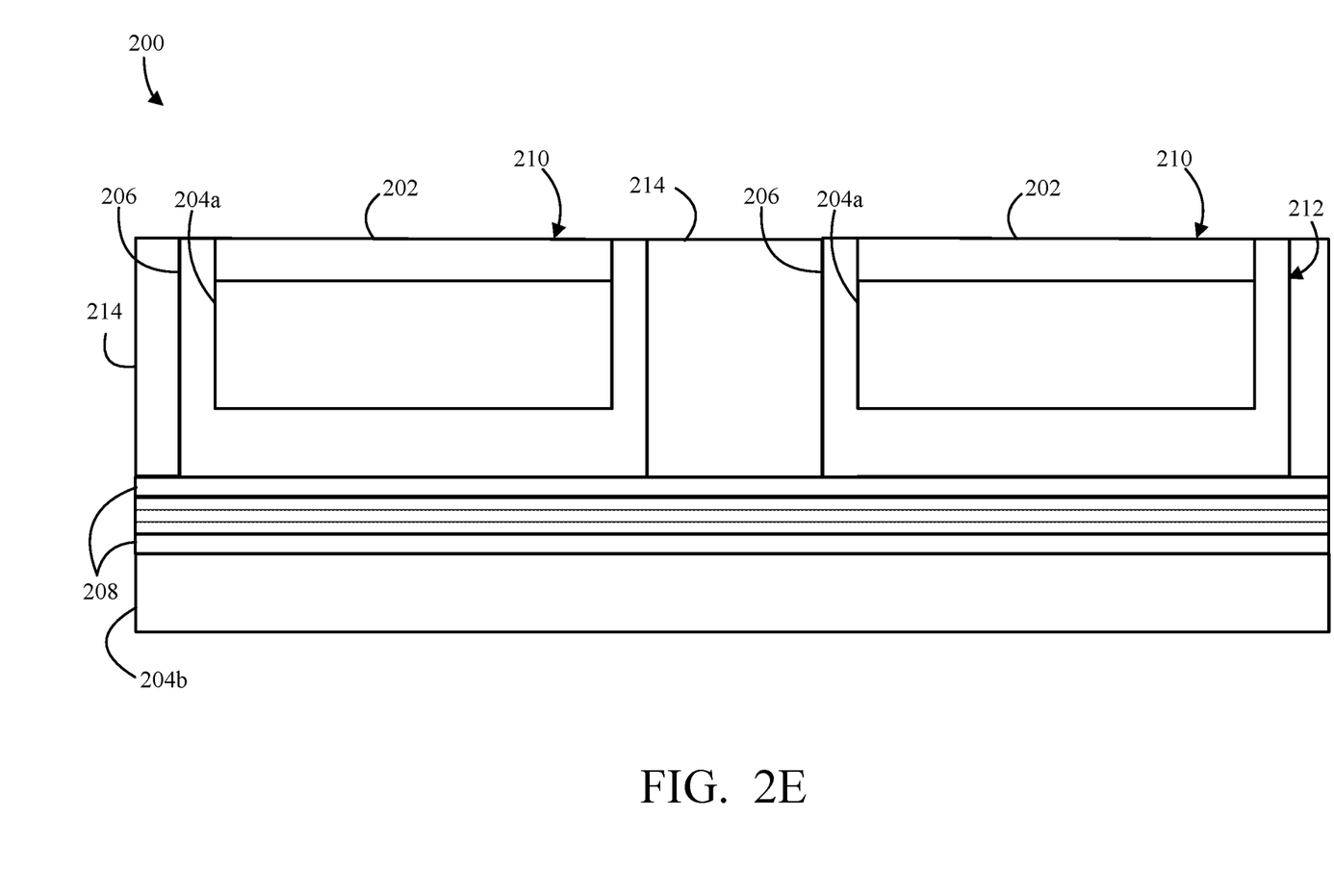
FIG. 2E is a side view of the traveling wave electrode of FIG. 2D with that is filled in with an undoped semiconductor structure.
Figure 2F:
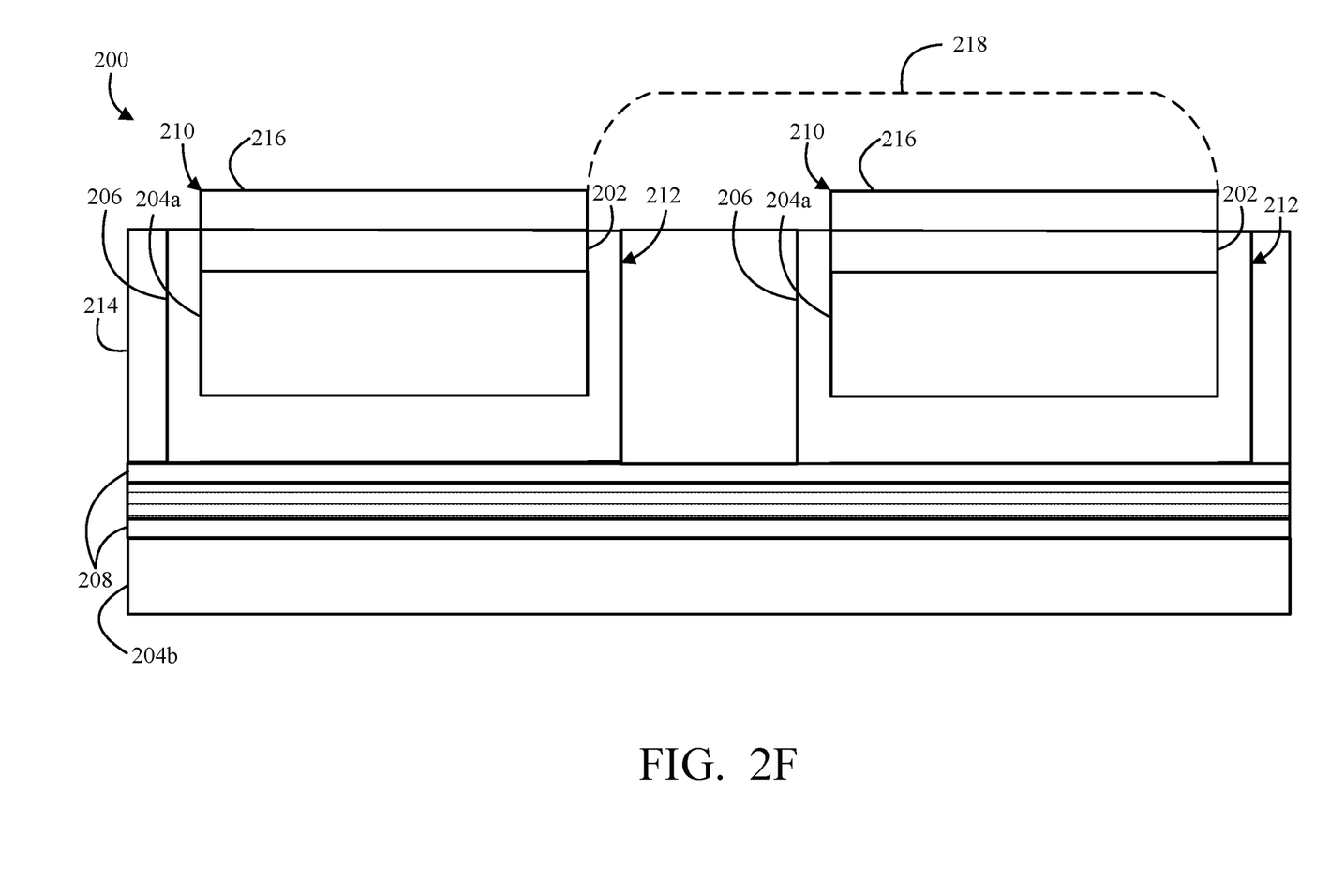
FIG. 2F is a side view of the traveling wave electrode of FIG. 2E with a metallic structure in contact with the first n-doped layer.

FIGS. 1-2F show a traveling wave electrode period structure that mitigates current leakages along the lateral walls of the top n-doped semiconductor structure in a n-p-i-n stack. This travelling wave electrode period structure can be modified in terms of a length of each period, a ratio of electrode-to-period length, and/or a thickness of one of the undoped semiconductor structures to control the speed of the RF and/or optical waves so that they travel at the same speed. The upper limit of the length of the period may be chosen such that the Bragg frequency of the electrode period is outside a useful bandwidth of the device and have acceptable transmission line capacitance. For example, the period length may be in the range of 50 micrometers (um) to 750 um.

FIG. 1 is a side view of a traveling wave electrode 100. The traveling wave electrode 100 includes n-doped semiconductor structures 102, 104a disposed on a n-doped semiconductor structure 104b that functions as a base for the traveling wave electrode 100. The n-doped semiconductor structures 102, 104a are surrounded by a p-doped semiconductor structure 106 that forms a cage. In this example, the n-doped semiconductor structure 104a has six surfaces or walls (a top, bottom, and four lateral surfaces), and the p-doped semiconductor structure 106 contacts at least three of these surfaces, namely two opposing lateral surfaces and a bottom surface. The n-doped semiconductor structures 102, 104a, 104b and the p-doped semiconductor structure 106 may include any material sufficient to form part of an optical waveguide and provide good quality electrical contacts required for DC bias provisioning and RF signal modulation. For example, the n-doped semiconductor structures 102, 104a, 104b and the p-doped semiconductor structure 106 may include one or more of Indium Gallium Arsenide, Gallium Arsenide, Indium Phosphide, Silicon, and any semiconductor material of similar crystal lattice constant to any of these aforementioned materials, or any combination thereof.

The n-doped semiconductor structures 102, 104a, 104b function to control a speed of the RF and/or optical waves when a reverse bias is applied by a DC bias. In some examples, the traveling wave electrode 100 may only include n-doped semiconductor structures 104a and 104b, so that the n-doped semiconductor structure 102 is absent. The n-doped semiconductor structure 102 may be described as an ohmic n-doped semiconductor structure. The n-doped semiconductor structures 102 and/or 104a may have any thickness and/or length sufficient to control the speed and loss of the RF and/or optical waves. The thickness may be measured from a bottom surface to a top surface. The length may be measured from a lateral wall to an opposing lateral wall. For example, the n-doped semiconductor structures 102 and/or 104a may have a thickness of about 0.5 um to about 2.0 um. In some examples, the n-doped semiconductor structure 102 has a thickness that is less than a thickness of the n-doped semiconductor 104a. The n-doped semiconductor structures 102 and/or 104a may have a length of about 25 um to about 300 um.

The p-doped semiconductor structure 106 functions to providing a current blocking layer at the bottom wall and the opposing lateral walls of the n-doped semiconductor structure 104a. In FIG. 1, the p-doped semiconductor structure 106 is shown extending from the bottom surface, along walls of the two opposing lateral surfaces, and to corners of the top surface. By covering portions of the two opposing lateral walls of the n-doped semiconductor structure 104a, the p-doped semiconductor structure 106 provides a barrier between the n-doped semiconductor structures 104a, 104b so that undesirable current leaking does not occur at the opposing lateral walls (i.e., in a horizontal direction) of the n-doped semiconductor structure 104a. In other examples, the p-doped semiconductor structure 106 may extend along and cover portions of each of the two lateral surfaces, such as a quarter portion, a half portion, a three-quarter portion, or any other portion along the two opposing lateral walls so that the p-doped semiconductor mitigates current leaking at the opposing lateral walls. The p-doped semiconductor structure 106 may have any thickness and/or length sufficient to block current leakages from the n-doped semiconductor structures 102, 104a, 104b. The thickness may be measured from a bottom surface to a top surface. The length may be measured from a lateral wall to an opposing lateral wall. For example, the p-doped semiconductor structure 106 may have a thickness of about 0.05 um to about 0.25 um. The p-doped semiconductor structure 106 may have a length extending from a lateral wall of the n-doped semiconductor structures 102, 104a to a lateral wall of the undoped semiconductor structure 114 of about 1 um to about 5 um. The p-doped semiconductor structure 106 may have a length that extends from one portion of the undoped semiconductor structure 114 to separate structure of the undoped semiconductor structure 114 of about 26 microns to about 305 microns.

Between the p-doped semiconductor structure 106 and the n-doped semiconductor structure 104b, an undoped semiconductor structure 108 that comprises an optical waveguide core 109 (e.g., a multi-quantum well structure) is shown extending in a horizontal direction relative to each of the n-doped semiconductor structures 102, 104a, 104b. The optical waveguide core 109 is positioned or embedded between two layers of undoped semiconductor structure 108 so that the optical waveguide core 109 is physically separated from the n-doped semiconductor structure 104b and the p-doped semiconductor structure 106. The optical waveguide core 109 provides a higher index of refraction than the layers above and below to provide confinement for the transverse spatial mode of the guided optical wave.

The undoped semiconductor structure 108 functions to embed the optical waveguide core 109 in a region of high electric field to maximize refractive index perturbation under electrical bias and modulation. The undoped semiconductor structure 108 may have any band gap sufficient to allow an optical wave to travel through the optical waveguide core 109. In some examples, the undoped semiconductor structure 108 may have a different band gap than another undoped semiconductor structure (e.g., undoped semiconductor structure 114) of the traveling wave electrode 100. The undoped semiconductor structure 108 may include any material sufficient to provide insulating properties to the traveling wave electrode. For example, the undoped semiconductor structure 108 may include one or more of Gallium Arsenide, Indium Phosphide, Silicon, and any semiconductor material of similar crystal lattice constant to any of these aforementioned materials, or any combination thereof. The undoped semiconductor structure 108 may have any thickness and/or length sufficient to house the optical waveguide core 109 and/or separate the p-doped semiconductor structure 106 and the n-doped semiconductor structure 104b. The thickness may be measured from a bottom surface to a top surface. The length may be measured from a lateral wall to an opposing lateral wall. For example, the undoped semiconductor structure 108 may have a thickness of about 0.4 um to about 1.5 um. The undoped semiconductor structure 108 may have a length of about 2000 um to about 5000 um.

The optical waveguide core 109 functions to guide optical waves along a propagation axis Z. The optical waveguide core 109 may include any material sufficient to respond to an applied radio frequency electric field wave by causing a change in the effective refractive index of the guided optical wave, which modulates the phase of the optical wave. For example, the optical waveguide core 109 may include one or more quantum well and barrier layer pairs comprised of Indium Gallium Arsenide Phosphide, Indium Aluminum Gallium Arsenide, or other material alloys of similar lattice constant to Indium Phosphide. The optical waveguide core 109 may have any bandgap sufficient to form an optical waveguide and provide high refractive index change efficiency when electrical voltages are applied. The optical waveguide core 109 may have a band gap that is lower than the bandgap of Indium Phosphide and/or the undoped semiconductor structure 108. In some examples, the optical waveguide core 109 may have a lower bandgap than the bandgap of all or some of the n-doped semiconductor structures 102, 104a, 104b. The propagation axis Z extends in a generally perpendicular direction relative to the height of a waveguide portion 110. Additionally or alternatively, the propagation axis Z extends parallel relative to the length of some or all of the n-doped semiconductor structure 104b, the undoped semiconductor structure 108, the p-doped semiconductor structure 106, and the n-doped semiconductor structure 104a. The waveguide portion 110 is integrated within a n-p-i-n stack sequenced from bottom to top as the n-doped semiconductor structure 104b, the undoped semiconductor structure 108, the p-doped semiconductor structure 106, and the n-doped semiconductor structure 104a. Additionally, the waveguide portion 110 may include other layers outside of an n-p-i-n stack, such as a metallic structure (e.g., metallic structure 116) and/or the n-doped semiconductor structure 102.

With the p-doped and n-doped semiconductor structures 106, 104a, 102, waveguide portions 110 are positioned on a base of the traveling wave electrode 100 that comprises the undoped and n-doped semiconductor structures 108, 104b. Each of these waveguide portions 110 are surrounded by the p-doped semiconductor structures 106 that are formed as p-doped cages 112 that completely separate the n-doped semiconductor structures 102, 104a and an undoped semiconductor structure 114. The undoped semiconductor structure 114 may function to provide a high resistivity material (i.e., an insulator) between the adjacent waveguide portions 110. The undoped semiconductor structure 114 may be the same or a separate structure from the undoped semiconductor structure 108 depending on the desired properties of the traveling wave electrode 100. The undoped semiconductor structure 114 may have any thickness and/or length sufficient to separate the waveguide portions 110 to avoid undesirable interactions. The thickness may be measured from a bottom surface to a top surface. The length may be measured from a lateral wall to an opposing lateral wall. In some examples, the undoped semiconductor structure 114 may have the same thickness as a p-doped cage 112 (as measured from a bottom surface at the undoped semiconductor structure 108 to a top surface of the n-doped semiconductor structures 102, 104a). For example, the undoped semiconductor structure 114 may have a thickness of about 0.5 um to about 2.0 um. The undoped semiconductor structure 114 may have a length of about 25 um to about 100 um.

On a top surface of the n-doped semiconductor structure 102, the metallic structure 116 functions to provide a surface that this highly conductive to assist with forming an electric field in each waveguide portion 110, which may be mainly present in the optical waveguide core 109 and the undoped semiconductor structure 108. The metallic structure 116 may only contact the n-doped semiconductor structure 102 and may be free of contact with other portions of the traveling wave electrode 100. In other examples, the metallic structure 116 may contact other portions of the traveling wave electrode 100, such as the n-doped semiconductor structure 104a, and/or a portion of the p-doped semiconductor structure 106. The metallic structure 116 may be any material sufficient to improve conductivity in the waveguide portion 110. For example, the metallic structure 116 may include Gold, Titanium, Platinum, Palladium and Germanium, or a combination thereof.

The traveling wave electrode 100 may have many different configurations and sizes depending on the particular application of the traveling wave electrode 100. The traveling wave electrode 100 may include any number of waveguide portions 110 that are separated by the undoped semiconductor structure 114. For example, the traveling wave electrode may include two or more waveguide portions 110. In some examples, a modulator (e.g., a Mach-Zehnder modulator) may include any number of traveling wave electrodes 100 arranged as periodic structures divided into periods 118 that function to modulate RF and optical waves when used alone or in combination. The periods 118 extend from one lateral wall of the waveguide portion 110 to a lateral wall of an adjacent waveguide portion 110. In other examples, the period 118 may be defined by any two points that are symmetrical and can form a repeatable pattern, such as a point of one waveguide portion that matches a symmetrical point of an adjacent waveguide portion.

As stated before, one of the periods 118 is defined by portions of two or more waveguide portions 110 (e.g., integrated in an n-p-i-n stack) separated by the undoped semiconductor structure 114 and/or the p-doped semiconductor structure. The periods 118 may be measured from a lateral wall of the waveguide portion 110 to the symmetrical lateral wall (e.g., left lateral wall of the first waveguide portion 110 to a left lateral wall of a second waveguide portion 110 that is adjacent) of another adjacent waveguide portion 110. The periods 118 may have a length of about 50 microns to about 750 microns. One traveling wave electrode 100 may include as many periods 118 as sufficient to provide desirable properties of the waveguide portions 110. For example, one traveling wave electrode 100 may include between about 20 and about 50 periods 118. A period 118 may include both p-doped semiconductor structure 106 positioned horizontal relative to the waveguide portion 110 and undoped semiconductor structure 114 positioned between two p-doped semiconductor structures 106. In other examples, the period 118 may include only p-doped semiconductor structures 106 that extend from one waveguide portion 110 to another waveguide portion 110 in a single contiguous structure.

FIG. 2A is a side view of a traveling wave electrode 200, which illustrates the basic structure of the traveling wave electrode 200 before a method is applied to alter the traveling wave electrode 200 to have a plurality of waveguide portions (e.g., 110 of FIG. 1 or 210 of FIGS. 2C-2F). The traveling wave electrode 200 may be similar to and have similar components as the traveling wave electrode 100 of FIG. 1. The traveling wave electrode 200 is arranged in a sequence of a first n-doped semiconductor structure 202, a second n-doped semiconductor structure 204a, a p-doped semiconductor structure 206, a undoped semiconductor structure 208, an optical waveguide core 209 embedded within the undoped semiconductor structure 208, and a third n-doped semiconductor structure 204b. When the traveling wave electrode 200 is formed, the crystal structure is grown from the bottom at the third n-doped semiconductor structure 204b (i.e., the base of the traveling wave electrode 200) upwards. Each successive semiconductor structure is grown on top of the last until the first n-doped semiconductor structure 202 is completed. In some examples, the traveling wave electrode 200 may be grown or deposited on a semi-insulating substrate or a conducting substrate. For example, the semi-insulating substrate may include Iron doped Indium Phosphide. For example, the conducting substrate may be Silicon, Sulfur Doped Indium Phosphide, or a combination thereof.

In some examples, the third n-doped semiconductor structure 204b may be formed as the substrate for the successive layers. A first layer of the undoped semiconductor structure 208 may be formed on top of the third n-doped semiconductor structure 204b, and the optical waveguide core 209 may be formed on top of the first layer of the undoped semiconductor structure 208. Over the optical waveguide core 209, a second layer of the undoped semiconductor structure 208 may be formed, and a layer of the p-doped semiconductor structure 206 may be formed over the undoped semiconductor structure 208. Next, a layer of the second n-doped semiconductor structure 204a may be formed on the p-doped semiconductor structure 206, and finally, a layer of the first n-doped semiconductor structure 202 may be formed at the top of the traveling wave electrode 200. With this configuration, the traveling wave electrode 200 is ready to be altered according to the teachings of this disclosure.

FIG. 2B is a side view of the traveling wave electrode 200 of FIG. 2A with portions of the first n-doped, second n-doped, and p-doped semiconductor structures 202, 204a, 206 removed. Each of the first n-doped, second n-doped, and p-doped semiconductor structures 202, 204a, 206 may be removed simultaneously or in sequence. After removing the first n-doped, second n-doped, and p-doped semiconductor structures 202, 204a, 206, waveguide portions 210 are formed.

Although only two of the waveguide portions 210 are shown, in a traveling wave electrode 200, more than two waveguide portions 210 are formed, as described herein, by this removal process, depending on how many periods (e.g., a period 218 of FIG. 2C or 2F). The area of the first n-doped, second n-doped, and p-doped semiconductor structures 202, 204a, 206 that is removed may be described a portion or gap between the waveguide portions 210. When the first n-doped, second n-doped, and p-doped semiconductor structures 202, 204a, 206 are removed, this removal process may be described as etching away the layers of structure. When the layers of the first n-doped, second n-doped, and p-doped semiconductor structures 202, 204a, 206 are removed, the waveguide portion 210 may have at least two opposing surfaces that are perpendicular relative to the top surface of the undoped semiconductor structure 208.

FIG. 2C is a side view of the traveling wave electrode 200 of FIG. 2B that is filled in with the p-doped semiconductor structure 206. The p-doped semiconductor structure 206 is filled, extended, and/or grown around opposing lateral surfaces of the first and second n-doped semiconductor structures 202, 204a so that a cage or bowl of p-doped semiconductor structure 106 is formed around the first and second n-doped semiconductor structures 202, 204a at the two opposing lateral surfaces and bottom surface. As illustrated, the other two opposing lateral surfaces are free of contact with the p-doped semiconductor structure 206, and the p-doped semiconductor structure 206 completely covers the top surface of the undoped semiconductor structure 208 so that the first and second n-doped semiconductor structures 202, 204a are free of contact or current pathways to the undoped and/or third n-doped semiconductor structures 208, 204b.

As stated above, although only two waveguide portions 210 are shown, more than two waveguide portions 210 may be present in the traveling wave electrode, and with the p-doped semiconductor 206 structure filling in the portions between the waveguide portions 210, current leaking from the first and/or second n-doped semiconductor structures 202, 204a to the undoped and/or third n-doped semiconductor 208, 204b is eliminated or mitigated. In this example, the p-doped semiconductor structure 206 is filled to a corner or edge of the top surface of the first and/or second n-doped semiconductor structures 202, 204a so that the two opposing lateral surfaces are completely covered or contacted by the p-doped semiconductor structure 206.

In this example, where the waveguide portions 210 are separated by p-doped semiconductor structures 206 arranged in the horizontal sections, the traveling wave electrode 200 may be contacted with a metallic structure (e.g., metallic structure 216 of FIG. 2F) at the top surface of the first n-doped semiconductor structure 202, and with the metallic structure, the traveling wave electrode 200 is complete and ready for use in a modulator or similar device. In these examples, the traveling wave electrodes 200 may have gaps or portions that are relatively short between the waveguide portions 210 because etching or removing portions of the p-doped semiconductor structure 206 and replacing with another semiconductor structure is impractical during production of waveguide portions 210. For example, the distance between the waveguide portions 110 may be about 5 microns to about 35 microns.

In other examples, the p-doped semiconductor structure 206 may only cover a portion of the two opposing lateral walls so that another layer of semiconductor structure (e.g., undoped semiconductor structure 214 illustrated in FIGS. 2E-2F) may be filled (i.e., grown) in such a way that the newly filled layer contacts a portion of the two opposing lateral walls where the p-doped semiconductor structure 206 is absent. In other words, the p-doped semiconductor structure 106 and another semiconductor structure may contact the two opposing lateral walls of the first and/or second n-doped semiconductor structures 202, 204a.

FIG. 2D is a side view of the traveling wave electrode 200 of FIG. 2C with a portion of the p-doped semiconductor structure 206 removed. The portion of the p-doped semiconductor structure 206 may be removed by any process known by the skilled artisan, such as by etching away the p-doped semiconductor structure 206. As illustrated, the p-doped semiconductor structure 206 completely covers the opposing lateral walls and the bottom surface of the first and/or second n-doped semiconductor structures 202, 204a. When the p-doped semiconductor structure 206 is removed, the undoped semiconductor structure 208 is exposed to the external environment and has some portions that contact the p-doped semiconductor structure 206 and portions that are free of contact with the p-doped semiconductor structure 206. With this configuration, a p-doped cage 212 is formed around the first and second n-doped semiconductors 202, 204a so that the two opposing lateral surfaces are not exposed to the external environment.

FIG. 2E is a side view of the traveling wave electrode 200 of FIG. 2D with that is filled in with an undoped semiconductor structure 214. The undoped semiconductor structure 214 is filled or grown at opposing lateral walls of the p-doped semiconductor structure 206 and at the top surface of the undoped semiconductor structure 208. The undoped semiconductor structure 208 has a lower bandgap energy than the undoped semiconductor structure 214 so that the electromagnetic waves traveling through the optical waveguide core 209 are desirably controlled. In other examples, the undoped semiconductor structures 208, 214 are substantially the same. With the formation of the undoped semiconductor structure 214 between the p-doped cages 212, the portions where the p-doped semiconductor 206 was removed are filled between the waveguide portions 210, and the p-doped cages 212 prevent or mitigate n-i-n (i.e., n-doped-undoped (i.e., intrinsic semiconductor structure)-n-doped) current leaks from the waveguide portion 210 when completely assembled and in use in a modulator or similar structure. In this example, replacing portions of the p-doped semiconductor structure 206 at gaps between the waveguide portions 210 with the undoped semiconductor structure 214 may be desirable to reduce optical losses in the traveling waveguide 200. For example, this may be useful when the gap has a length extending between the waveguide portions 210 of between about 5 um and about 400 um.

FIG. 2F is a side view of the traveling wave electrode 200 of FIG. 2E with a metallic structure 216 in contact with the first n-doped semiconductor structure 202. The metallic structure 216 is configured to connect with a DC bias so that a voltage may be present between any or all of the first, second, or third n-doped semiconductor structures 202, 204a, 204b.

Figure 3:
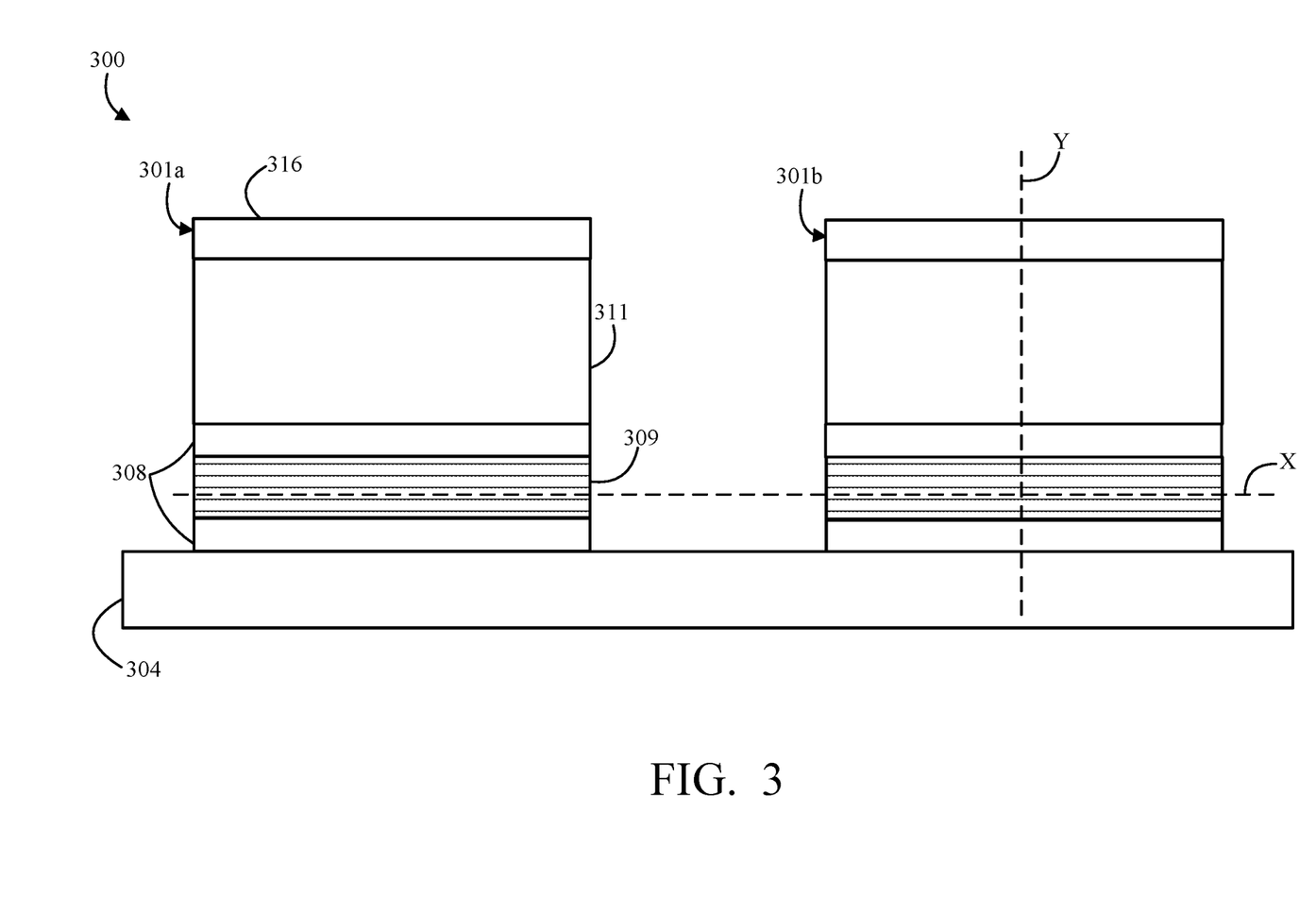
FIG. 3 is a transverse cross-sectional view of a pair of transverse ridge waveguides 300 (e.g., forming a pair of adjacent arms of a MZM) that provide transverse confinement of guided optical waves along an X axis.

FIG. 3 is a transverse cross-sectional view of a pair of transverse ridge waveguides 300 (e.g., forming a pair of adjacent arms of a MZM) that provide transverse confinement of guided optical waves along an X axis. The transverse ridge waveguides 300 includes a pair of traveling wave electrodes 301a, 301b that work in tandem to control the speed of RF and optical waves. At a base of the transverse ridge waveguides 300 is a n-doped semiconductor structure 304 that forms the substrate upon which the transverse ridge waveguides 300 are formed. The waveguide portions 301a, 301b each include metallic layer 316 stacked on a waveguide structure 311, which is stacked on the combination of the undoped semiconductor structure 308 and optical waveguide core 309, which provides transverse confinement of guided optical waves along a Y axis. The waveguide structure 311 may include any arrangement of semiconductor structures disclosed herein, such as periods (118, 218), which may be described to include p-doped semiconductor structures, n-doped semiconductor structures, and/or undoped semiconductor structures (e.g., the p-doped semiconductor structures 106, 206, n-doped semiconductor structures 102, 104a, 104b, 202, 204a, 204b, and undoped semiconductor structures 114, 214 of FIGS. 1-2F).

The axis X and the axis Y of FIG. 3 are both perpendicular to the propagation axis Z of FIG. 1. For example, although not shown, the propagation axis Z would extend parallel relative to a length of the traveling wave electrodes 301a, 301b, as shown in FIG. 1.

The traveling wave electrodes 100, 200, 301a, 301b and/or transverse ridge waveguide 300 may be used in a modulator to control the velocity of RF and optical waves. In some examples, the modulator is a Mach-Zehnder modulator. The traveling wave electrode structures of the modulator may be in electrical contact with a number of coplanar strip electrodes in any suitable arrangement (e.g., in a ground-signal-signal-ground arrangement) to serve as electrical transmission lines that direct and/or control the RF waves to modulate the optical waves. When in use in the modulator, the traveling wave electrodes 100, 200, 301a, 301b may be arranged as periods 118, 218 that are spaced a distance apart. The periods 118, 218 of the traveling wave electrodes 100, 200 may have a length of about 50 um to about 750 um. The upper limit of the length of the periods 118, 218 may be chosen such that the Bragg frequency of the electrode period is outside a useful bandwidth of the device and to avoid excessive transmission line capacitance. When in use with a modulator, the traveling wave electrodes 100, 200 may be connected with a DC bias that is configured to apply a reverse bias onto the traveling wave electrode 100, 200 so that the velocity of the RF and/or optical waves is controlled. In controlling the RF and/or optical waves, the traveling wave electrodes 100, 200 should be arranged such that the velocity of the RF and/or optical waves is matched.

The process of doping a semiconductor material can be accomplished, for example, as part of a fabrication process by introducing atoms of a foreign material (also called "impurities"), which can be of two different types: an n-type dopant in an n-doped material (which provides free electrons as negative charge carriers), or a p-type dopant in a p-doped material (which provides mobile holes as positive charge carriers). An example of p-type dopants in Indium Phosphide includes Zinc. Examples of n-type dopants in Indium Phosphide include Silicon, or Sulphur.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:
1. A device, comprising:
two or more waveguide portions that are adjacent to each other, each of the two or more waveguide portions, comprising
a first n-doped semiconductor structure; and
a p-doped semiconductor structure in contact with the first n-doped semiconductor structure at a bottom wall and two lateral walls on opposite ends of the first n-doped semiconductor structure;

an undoped semiconductor structure in contact with each of the p-doped semiconductor structures and free of contact with each of the first n-doped semiconductor structures, the undoped semiconductor structure comprising an optical waveguide core embedded within the undoped semiconductor structure; and a second n-doped semiconductor structure in contact with the undoped semiconductor structure and free of contact with each of the first n-doped semiconductor structures and the p-doped semiconductor structures.

2. The device of claim 1, wherein the optical waveguide core extends parallel relative to a propagation axis, and wherein the two lateral walls of the first n-doped semiconductor structure extend generally perpendicular relative to the propagation axis.

3. The device of claim 1, wherein each of the two or more waveguide portions are separated at an opposing wall of the two lateral walls of the p-doped semiconductor structure by the undoped semiconductor structure so that under a DC bias current flow is mitigated or prevented between the first and second n-doped semiconductor structures through the undoped semiconductor structure.

4. The device of claim 3, wherein the undoped semiconductor structure extends from an upper edge of each of the two lateral walls of the p-doped semiconductor structure of the two or more waveguide portions to second n-doped semiconductor structure.

5. The device of claim 1, wherein each of the two lateral walls of the p-doped semiconductor structure extend from a bottom edge to a top edge of the first n-doped semiconductor structure so that leakage of current is prevented or mitigated from the first n-doped semiconductor structure to an outer surface of the two lateral walls of the p-doped semiconductor structure.

6. The device of claim 1, wherein the first and/or second n-doped semiconductor structure, p-doped semiconductor structure, or any combination thereof comprise Indium Phosphide.

7. The device of claim 1, wherein the undoped semiconductor structure comprises undoped Indium Phosphide.

8. The device of claim 1, wherein the optical waveguide core comprises a multi-quantum well.

9. The device of claim 1, wherein the device is configured to be integrated with a transverse ridge waveguide.

10. The device of claim 1 wherein the device is configured to be integrated with a Mach-Zehnder modulator.

11. A modulator, comprising:
one or more traveling wave electrodes comprising
one or more periods extending from a portion of a waveguide portion to a symmetrical portion of another waveguide portion, each of the waveguide portions positioned adjacent to each other, each of the waveguide portions comprising
a first n-doped semiconductor structure; and
a p-doped semiconductor structure in contact with the first n-doped semiconductor structure at a bottom surface and two opposing lateral walls of the first n-doped semiconductor structure;
an undoped semiconductor structure in contact with each of the p-doped semiconductor structures and free of contact with each of the first n-doped semiconductor structures, the undoped semiconductor structure comprising an optical waveguide core embedded within the undoped semiconductor structure; and
a second n-doped semiconductor structure in contact with the undoped semiconductor structure and free of contact with each of the first n-doped semiconductor structures and the p-doped semiconductor structures.

12. The modulator of claim 11, wherein p-doped, first and second n-doped, and undoped semiconductor structures comprise Indium Phosphide.

13. The modulator of claim 11, wherein the modulator is a Mach-Zehnder modulator.

* * * * *